US011218907B2

(12) United States Patent
Balakrishnan et al.

(10) Patent No.: US 11,218,907 B2
(45) Date of Patent: Jan. 4, 2022

(54) PUBLISHER CONTROL IN AN INFORMATION CENTRIC NETWORK

(71) Applicant: Intel Corporation, Santa Clara, CA (US)

(72) Inventors: Ravikumar Balakrishnan, Hillsboro, OR (US); Venkatesan Nallampatti Ekambaram, Hillsboro, OR (US); Srikathyayani Srikanteswara, Portland, OR (US); Jessica C. McCarthy, Dublin (IE); Eve M. Schooler, Portola Valley, CA (US); Sebastian Schoenberg, Hillsboro, OR (US); Rath Vannithamby, Portland, OR (US); Moreno Ambrosin, Padua (IT); Maruti Gupta Hyde, Portland, OR (US)

(73) Assignee: Intel Corporation, Santa Clara, CA (US)

(*) Notice: Subject to any disclaimer, the term of this patent is extended or adjusted under 35 U.S.C. 154(b) by 49 days.

(21) Appl. No.: 16/236,037

(22) Filed: Dec. 28, 2018

(65) Prior Publication Data
US 2019/0141568 A1 May 9, 2019

Related U.S. Application Data

(60) Provisional application No. 62/716,121, filed on Aug. 8, 2018.

(51) Int. Cl.
H04W 28/06 (2009.01)
H04W 4/40 (2018.01)
(Continued)

(52) U.S. Cl.
CPC ............ *H04W 28/06* (2013.01); *G06F 16/00* (2019.01); *G08G 1/012* (2013.01); *G08G 1/0112* (2013.01);
(Continued)

(58) Field of Classification Search
CPC ......... H04W 28/06; H04W 4/38; H04W 4/44; H04W 4/40; H04W 4/08; H04W 4/02;
(Continued)

(56) References Cited

U.S. PATENT DOCUMENTS 9,363,179 B2 * 6/2016 Mosko ................... H04L 41/12
10,062,414 B1 * 8/2018 Westphal .......... H04N 21/23406
(Continued)

OTHER PUBLICATIONS

"Greedy Coloring", Retrieved from: https: en.wikipedia.org wiki Greedy_coloring, (Accessed on May 1, 2019), 9 pgs.
(Continued)

Primary Examiner — Kibrom T Hailu
(74) Attorney, Agent, or Firm — Schwegman Lundberg & Woessner, P.A.

(57) ABSTRACT

System and techniques for publisher control in an information centric network (ICN) are described herein. Named data criteria to identify data for a workload may be constructed. A discriminator for potential publishers of the data may be constructed. An interest packet may be transmitted based on the named data criteria and the discriminator and a response to the interest packet received from one of the potential publishers.

24 Claims, 10 Drawing Sheets

(51) Int. Cl.
*H04W 4/38* (2018.01)
*H04W 4/08* (2009.01)
*G08G 1/01* (2006.01)
*H04L 29/06* (2006.01)
*H04N 21/00* (2011.01)
*H04W 4/44* (2018.01)
*H04L 29/08* (2006.01)
*G06F 16/00* (2019.01)
*H04W 4/02* (2018.01)

(52) U.S. Cl.
CPC ....... *G08G 1/0129* (2013.01); *H04L 65/4076* (2013.01); *H04L 67/327* (2013.01); *H04N 21/00* (2013.01); *H04W 4/08* (2013.01); *H04W 4/38* (2018.02); *H04W 4/40* (2018.02); *H04W 4/44* (2018.02); *H04L 67/12* (2013.01); *H04W 4/02* (2013.01)

(58) Field of Classification Search
CPC ...... G06F 16/00; G08G 1/0112; G08G 1/012; G08G 1/0129; H04L 65/4076; H04L 67/327; H04L 67/12; H04N 21/00
See application file for complete search history.

(56) References Cited

U.S. PATENT DOCUMENTS

| | | | | |
|---|---|---|---|---|
| 2014/0023076 | A1* | 1/2014 | Calo | H04L 45/34 370/392 |
| 2015/0269633 | A1* | 9/2015 | Mahadevan | G06Q 30/0269 705/71 |
| 2017/0366526 | A1* | 12/2017 | Wood | H04L 63/0853 |
| 2018/0145945 | A1* | 5/2018 | Hyde | H04L 67/10 |
| 2018/0242186 | A1* | 8/2018 | Muscariello | H04L 67/2842 |
| 2018/0242218 | A1* | 8/2018 | Muscariello | H04W 40/02 |
| 2018/0309666 | A1* | 10/2018 | Lei | H04L 43/0864 |
| 2018/0367452 | A1* | 12/2018 | Amin | H04L 45/66 |
| 2019/0045207 | A1* | 2/2019 | Chen | G06K 9/72 |
| 2019/0089643 | A1* | 3/2019 | Westphal | H04N 21/21805 |
| 2019/0199633 | A1* | 6/2019 | Azgin | H04L 45/54 |

OTHER PUBLICATIONS

"Homomorphic encryption", Retrieved from internet: https: en.wikipedia.org wiki Homomorphic_encryption, (Accessed on May 1, 2019), 8 pgs.

"Security Credential Management System", Retrieved from the internet: https: www.its.dot.gov resources scms.htm, (Accessed on May 1, 2019), 8 pgs.

"Top 5 Cities with the Largest Surveillance Camera Networks", VINTECH Retrieved from internet: https:vintechnology.com, (May 4, 2011), 9 pgs.

Britz, D M, "Wireless big data are our wireless edge networks ready?", 2014 39th International Conference on Infrared, Millimeter, and Terahertz waves (IRMMW-THz), Tucson, AZ, (2014), 4 pgs.

Pradhan, S, "Distributed source coding using syndromes (DISCUS): Design and construction", IEEE Transactions on Information Theory 49.3, (2003), 626-643.

Xylomenos, George, "A survey of information-centric networking research", IEEE Communications Surveys and Tutorials 16.2, (2014), 26 pgs.

* cited by examiner

PUBLISHER CONTROL IN AN INFORMATION CENTRIC NETWORK

CLAIM OF PRIORITY

This patent application claims the benefit of priority, under 35 U.S.C. § 119, to U.S. Provisional Application Ser. No. 62/716,121, titled "INFORMATION CENTRIC NETWORK CROSS-LAYER MANAGEMENT" and filed on Aug. 8, 2018, the entirety of which is hereby incorporated by reference herein.

TECHNICAL FIELD

Embodiments described herein generally relate to computer networking and more specifically to publisher control in an information centric network (ICN).

BACKGROUND

More and more devices are equipped with sensors to provide data about their surroundings. These sensors are being mounted on buildings, devices (e.g., mobile phones), and vehicles. Connections to these sensors may take many wired or wireless forms. As these sensors and connection technologies proliferate, a complex and dynamic network topology is often employed to connect sensor data to sensor data consumers.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
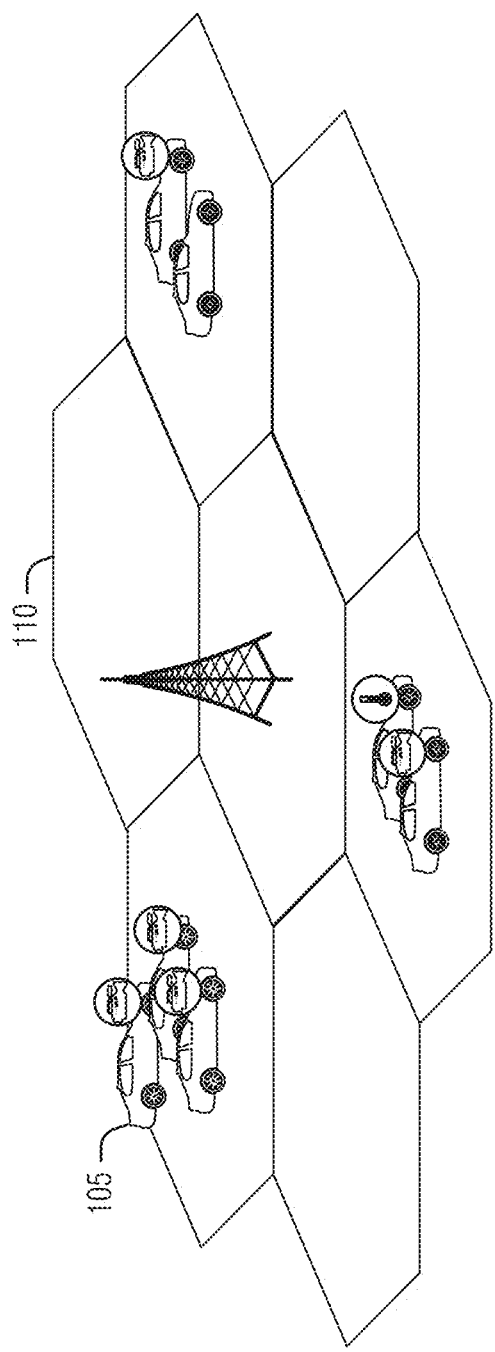
FIG. 1 illustrates an example of an environment for publisher control in an ICN, according to an embodiment.

ICN is a networking paradigm—several details of which are provided below with respect to FIG. 9—providing benefits to modern communications that have tended to be data centric rather than connection centric. For example, video surveillance networks are becoming increasingly popular and are deployed in many major cities to monitor crime and protect our communities. This activity includes collecting video data from several devices each carrying its own camera and video information and stitching a 360° video at an edge node to achieve 360° video surveillance. The video may be obtained from autonomous cars at a road-side-unit (RSU) edge node. Autonomous vehicles will often have a variety of sensors retrofitted to achieve autonomy—for example, cameras fitted in these vehicles may capture local visual information data used to detect obstacles and provide context awareness for autonomous navigation. Further, these vehicles are often connected via wireless (e.g., cellular) networks.

While such a system of autonomous vehicles may be used to augment a statically deployed surveillance system, correctly identifying appropriate vehicles may be a challenge for traditional networking paradigms whereby the individual vehicles are identified and placed at a geographic location. That is, it may be challenging to construct an efficient 360 degree video from a set of distributed nodes (e.g., via crowdsourcing) using low-latency communication—often required for interactive applications that enable users to zoom in to any location and point in time and understand the events happening at that coordinate. Without a co-design of wireless and information routing layers, networks may spend a lot of time to establish connections—including end-to-end context, locating vehicles, etc.—before transmitting data packets. Moreover, the high data rates of the sensor data (e.g., video, audio, etc.) entail nodes transmitting high data rates in short periods of time. This issue becomes particularly difficult in a mobile scenario where the video segments, for example, are collected from connected vehicles. Wireless ICN address several of these issues by more efficiently addressing pertinent vehicle sensors even in highly mobile environments by crafting interests that name the data with geographical identifiers.

Thus, using a wireless ICN may have tremendous benefits of bandwidth consumption, energy efficiency, or reducing network busy periods. However, it may also entail several challenges if the wireless media access control (MAC) is not co-designed to be aware of the information routing layer and reconfigured for the data that is moving in the network. Further, the lack of co-design between the MAC-physical (PRY) layers and ICN may potentially lead to security vulnerabilities that an attacker may leverage to attack the network.

Principles and potential optimizations of ICN have been largely explored in wired settings. A wireless setting, however, offers different challenges and opportunities for ICN optimization that are yet to be explored. Standard communication models typically adopt a pure layered approach that implements a clear separation between the roles of the information routing layer (e.g., ICN), and the underlying lower layers (MAC and PHY). This approach favors the independent evolution of every layer, whose functions are independent from the lower or upper layer. However, cross-layer optimizations have the potential to bring benefits to energy optimization and resource utilization, which are often significant to applications relying on wireless communications where bandwidth and energy are expensive entities. As ICN brings new design and features to the network layer—such as in-network caching and interests aggregation—cross-layer optimizations between the information routing layer and the MAC or PHY layers may potentially be significant benefits.

FIG. 1 illustrates an example of an environment to implement ICN cross-layer management for publisher control, according to an embodiment. As illustrated, the environment includes several autonomous vehicles (e.g., vehicle 105) with various sensors connected via a wireless network 110. The sensors may include still or moving images (e.g., video), temperature, depth sensors, etc. However, any sensor-based device may be substituted in the following examples. Further, while several examples described capturing 360° video or other sensor data for a geographic location, the principles may be extended to cover several other scenarios in which the publishers (e.g., data providers) are dynamic or in which several publishers are providing correlated data. Using cross-layered approaches, such as those described herein, may improve the overall communication efficiency by reaching the publisher quickly and more cost-effectively.

Publisher control may include modifying interest packets to enable fuzzy content requests. Also, publisher response protocols that are aware of the data correlation may be used. Further, ICN-aware channel coding at the PHY layer may exploit correlations and maximize resource utilization while addressing security concerns that may arise. Additional examples and details are described below.

Figure 2:
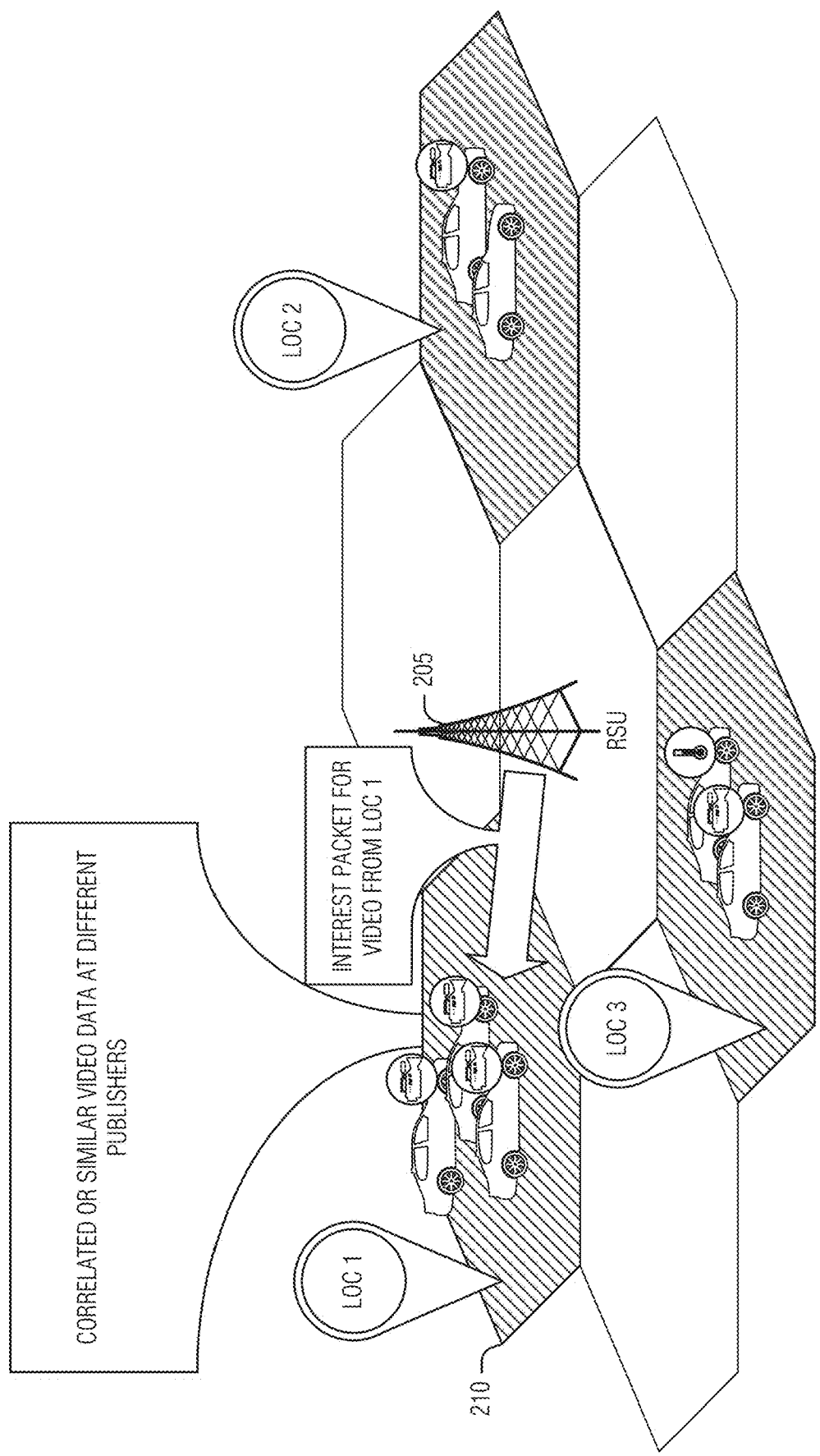
FIG. 2 illustrates an example of location correlated content, according to an embodiment.

FIG. 2 illustrates an example of location correlated content, according to an embodiment. Here, cross-layer optimizations in the context of a wireless broadcast domain are considered. The examples below are described in the context of the following two scenarios: 1) where a subscriber 205 is interested in a specific content that is available at multiple publishers; and 2) where publishers have correlated data that provides opportunities for promoting better use of the wireless media resources opportunistically preventing duplicate data transmissions. In scenario 1, the publishers may share the same Layer 2 wireless broadcast domain. Here, the subscriber 205 transmits an interest packet for named data that is available from multiple publishers in this broadcast domain. Assuming an information routing layer, the interest packet is not targeted towards any particular publisher when it is forwarded over the wireless interface, Therefore, any of these publishers may reply. In contrast, in a transmission control protocol (TCP) internet protocol (IP) setting, the subscriber would need to direct the request towards a specific IP destination or use a broadcast or multicast packet.

At Layer 2, a wireless domain is naturally a broadcast, A wireless client is able to receive other wireless transmissions within its broadcast domain unlike most wired links that are point-to-point. Thus, an interest packet need not be sent out through multiple interfaces in a wireless domain vs. a wired domain. This saves overhead by sending a single interest packet rather than sending multiple interest packets. The downside is a potential non-optimal use of the wireless media. For example, the technique may cause unnecessary duplicate responses (e.g., data packets) to the same interest from all the producers, which likely will be discarded by the subscriber 205 and potentially cause collisions, assuming a contention-based wireless protocol such as IEEE 802.11. Further, interference generally may be a problem with wireless broadcasts. For example, when every node is broadcasting, their transmissions may interfere with each other, thereby causing serious issues in decoding the intended received signal. Therefore, there is a need to prevent multiple publishers from responding to the same interest packet.

A practical example of such a scenario is an autonomous or intelligent vehicle use case where a Road Side Unit (RSU) 205 requests a video feed of a particular geographic location 210 (e.g., intersection). Multiple vehicles that pass through that location potentially may have equivalent content. In this scenario, the goal is to manage vehicle responses to avoid several from responding the same or equivalent content, which may cause increased interference or duplication of packets that waste bandwidth and energy.

The following techniques may be used to maximize resource utilization. In an example, the RSU 205 (e.g., base station) gathers knowledge of the number of vehicles or User Equipment (UE) in a geographic location 210 of interest. This may be based on the number of entities connected to that base station 205, or in the case of an RSU 205, the knowledge of the vehicle locations, which may be gathered, for example, from Basic Safety Messages (BSMs) periodically sent by each vehicle, or from the number of vehicles in a field-of-view based on camera inputs. This may provide an idea of the number of publishers that potentially have the same data. Let us denote this number as N.

The subscriber 205 transmits an interest packet, with a field containing a parameter that is a function of N, $f(N)$. The publishers access the channel based on $f(N)$. In an example, this parameter may be the probability of channel access. As an example, each publisher accesses the channel with probability $f(N)=1/N$ to minimize the possibility of collision.

A publisher that successfully obtains channel access transmits the requested data in an ICN data packet back to the RSU 205. In an example, all other publishers in the wireless domain are able to overhear the data packet and choose to remain silent or respond with some probability. This may be used to limit the impact of Denial of Service (DoS) attacks where an attacker responds to every query with random data; the goal of which is to prevent the consumer (e.g., the RSU 205) from receiving the requested data. In an example, after receiving the first data packet corresponding to the interest, the subscriber issues a "NULL interest" packet or an "interest fulfilled" packet, to declare that its interest was fulfilled and therefore no other publisher needs to respond. NULL interest or interest fulfilled packets are not interest packets, and as such do not expect a response. Furthermore, to prevent DoS attacks aimed at preventing the RSU 205 from obtaining the data packet corresponding to the initial request, NULL interest or interest fulfilled packets may be signed to avoid attackers sending illegitimate ones.

In the examples above, it is assumed that the packet transmissions are omni-directional and therefore all other publishers may overhear the data transmissions. Other techniques may be employed in a multi-beam scenario.

In an example, the scenario where publishers have a cluster head or a few cluster heads that are in a high-power mode and the rest are in a low-power mode is considered. The subscriber 205 is in a high-power mode and transmits interest packets. The publisher in the high-power mode receives the interest packet and then duty cycles between the other publishers providing the content. The publisher nodes in a cluster may use other communication media—such as wire connected publisher nodes, Bluetooth or other low power communication media based connected publisher nodes, or proximity based low power connectivity based connected publisher nodes among them. In an example, a cluster node may also be an intermediate (e.g., forwarding) node that orchestrates interest and data packet routing between the subscriber 205 and the publisher. The cluster head, in these examples, acts as a mediator for controlling the interference in the network by intelligently scheduling the transmissions.

Once the interest packet is received by the cluster head, it may wake up one or more of the nodes in the cluster and convey the interest packet. The publisher nodes may respond to the interest packet directly or through the cluster head node. The cluster head may save power by activating a single publisher at a time, but it may also be used for conveying data. For example, the cluster head may have a better channel or link to the subscriber, reducing the power used to transmit the data. To employ power savings in all nodes, it is possible to select different cluster heads to take turns. Further, to improve reliability, there may be more than a single cluster head, such as a primary and secondary cluster heads that both listen to the subscriber and coordinate to convey the interest packet to the other nodes in the cluster. For example, the primary cluster head may convey the interest packet, but if the secondary cluster head didn't receive the interest packet from the primary cluster head, then the secondary cluster head may convey the interest packet to the rest of the nodes in the cluster.

Consider the scenario where publishers and subscriber 205 share the same wireless domain. Here, there is a difference in the type of content being requested by the subscriber 205 and the data available at the publishers as compared to the scenario described above. In many cases, it is likely that the publishers have closely correlated data, but not the exact same data. For example, in the autonomous driving use case, the camera feeds from different vehicles in nearby locations 210 may have significantly overlapping field-of-views (FoVs) but not exactly the same FoVs. Further, the interest packet may not be specific, but "fuzzy" in nature. A fuzzy interest packet is an interest packet where the named content is not completely matched to a precise content, but rather may use the longest prefix-matching premise of ICN, where the prefix of the named content in the interest is matched to that of the content. If the prefix has a complete match, then the content is selected. For example, if the interest packet contains a name string, "/Connected-Cars/GeoLocationCountryCityCountyRoad/DateTime-stamp/VideoFrontView," the publisher receiving this interest packet may have a content with the name "/ConnectedCars/GeoLocationCountryCityCountyRoad/DateTimestamp/VideoFrontView1223_vehicleLCxyz," in its cache. In this case, because the requested named field exactly matches the prefix of the named content in the publishers' cache, it will be selected as a match. Fuzzy interests may include such requests for all video feeds in range respective to a location range. Alternatively, the interest may contain a function to be applied to the data packet after an authenticity or integrity verification process. In an example, the function may include stitching and reconstruction of video to combine all the camera feeds in the location. This may be computed in-network by the publishers.

In an example, where the data is correlated and for the fuzzy interest to be fulfilled by the publishers, data from multiple publishers may be provided to the subscriber 205. Here, the subscriber 205 transmits an interest packet with a fuzzy identifier. A publisher that gets access to the channel (e.g., any standard underlying MAC protocol may be assumed) transmits its raw data. A second publisher listens to the transmitted data packet, verifies its signature for integrity or authenticity—e.g., ICN data packets are signed and the signature is publicly verifiable; this may be achieved, for example, using certificates as specified by the IEEE 1609.2 standard, which may be anonymously issued by a public key infrastructure (PKI) such as SCMS—decodes the data, and conditioned upon this data, encodes (e.g., compresses) its own data that is ready to be transmitted. In an example, the compression may be, in the vehicular use case, determining the nonoverlapping FoVs of the camera feeds and transmitting only the overlapping portion. In an example, more sophisticated physical layer coding mechanisms, such as DISCUS may be used.

The possibility of compression assumes that, in case confidentiality is preserved through encryption, the data payload is accessible (e.g., may be decrypted) by all publishers in the same wireless broadcast domain. For example, publishers in the same domain may make use of a shared symmetric key for packet encryption or decryption.

Data compression may be repeated in succession by multiple publishers who compress their data conditioned upon what other publishers' data has been received up until that time. It is possible that the gains from such a compression methodology may not be significant as compared to the overhead of decoding and re-encoding. Thus, in an example, a metric based on multiple parameters may be used to determine whether to perform compression or whether to transmit the raw data. This may be a function of energy to receive, energy to decode, energy for compression, or energy for transmission in relation to energy for transmission in the no compression case:

$$F\_1 \text{ energy, decode\_energy, compression, tx) vs } F\_2 \text{ (tx energy)}$$

Further this may also depend on the topology of the network or the broadcast domain. For example, in the case of a line network where each publisher has connection to two other publishers and the subscriber 205 is at the top of the graph, every publisher not only transmits its own data but also transmits data aggregated from publishers down the chain. This may be lot of overhead and may be significantly reduced if the publishers compressed their own data conditioned on the data they receive. In another example, it may be a fully connected network where every publisher may listen to every other publisher and the subscriber. In such a case, the benefits of compression may not be high. Therefore, the metric used to decide on the compression may be a function of the topology as well.

In an example, a scenario where the subscriber 205 not only provides fuzzy content but also a function that may be computed in-network is considered. For example, the function may be a video stitching function where the subscriber 205 is interested in a video reconstruction of a scene based on information from multiple vehicles. In an example, the subscriber 205 may receive all the data from the nodes and stitch the videos itself. In an example, each publisher, on overhearing the data from the other publishers, may perform the stitching locally with its own data and transmit the computed function result. In an example, instead of the content being compressed by other publishers along the path to the subscriber 205, the content may be compressed by the publisher itself via application of the compute function attached within the interest packet. This may be beneficial in a network topology such as a line graph where the publisher may transmit the stitched video up the network.

Thus, in an example, the subscriber 205 transmits a fuzzy interest packet along with a function to be computed. The first publisher that gets channel access responds with the data packet it has (e.g., a portion of the data). A second publisher computes the function of the received data packet and its own data. The second publisher then transmits the computed function result. These elements may be repeated until the final data reaches the subscriber. In an example, the first publisher may only be able to reply with the function that provides the best result for the compute task. This may be based on the parameters and key performance indicators (KPIs) of an interest provided in the interest packet. A second publisher may be able to execute this selected function on its own local data.

In an example, data packets are checked for authenticity or integrity and decrypted if confidentiality protected before applying the processing function. In an example, the processing function may operate in the encrypted domain, such as by using homomorphic encryption.

Figure 3:
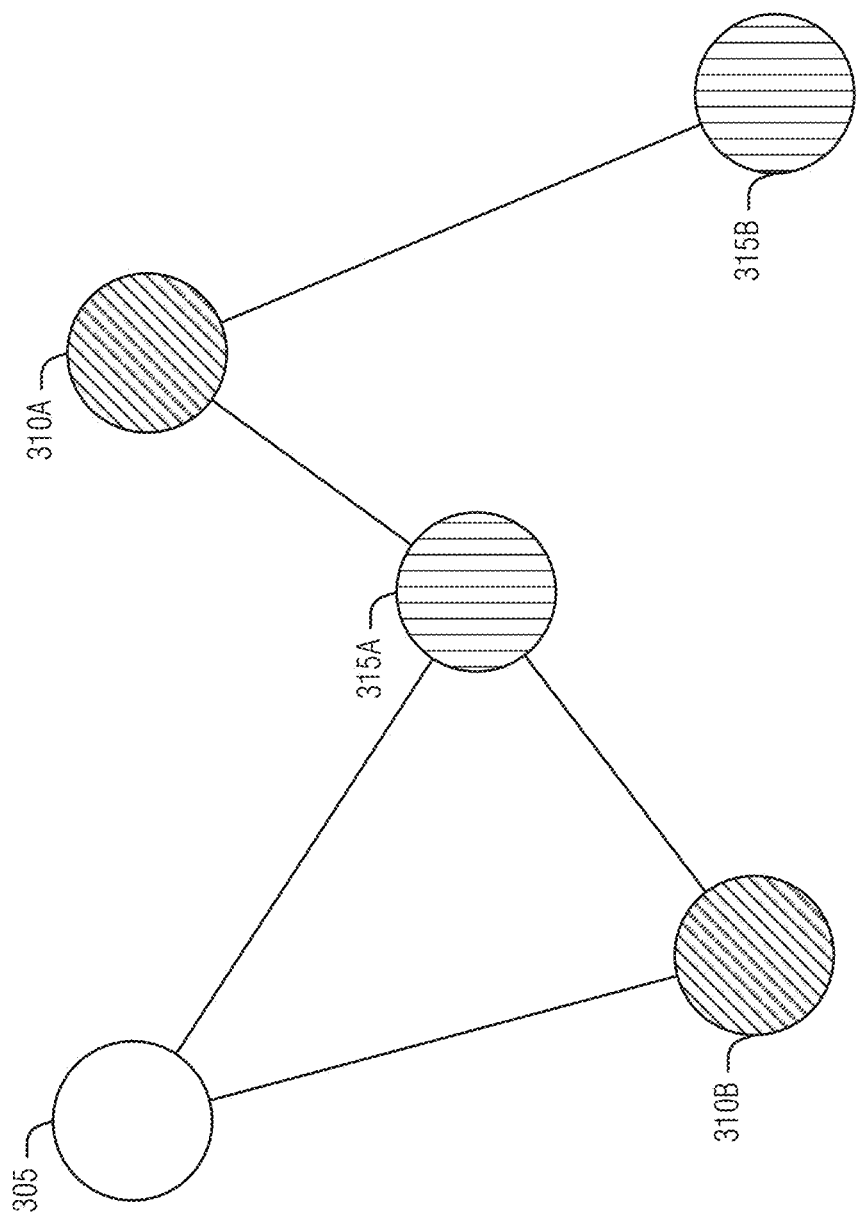
FIG. 3 illustrates an example of content provider division, according to an embodiment.

FIG. 3 illustrates an example of content provider division, according to an embodiment. This example is a multiple publisher optimization. The subscriber may logically divide the groups of publishers (e.g., vehicles) into multiple groups and assign non-overlapping duty cycles between the groups. Thus, for example, the duty cycle may be set to 20%, where a given group is actively listening or "ON" for 20% of a given cycle time. The cycle time depends on the desired response time and is a trade-off between desired response time and the energy savings. The longer the cycle, the greater the power savings and the slower the response time.

The subscriber then sends the interest packet during each cluster's ON time. All of the groups may be using the same duty cycle but staggered by offsets such that their ON durations do not overlap. This minimizes collisions from different publishers within different groups responding to the same interest packet as well as saving energy by restricting interest packets to a single group of nodes. The group may be expanded if the interest remains unfulfilled. This mitigates the need for all publishers to be awake all the time.

In an example, the link layer is used to logically divides the groups of publishers (e.g., UEs) in the same broadcast domain into multiple sub-groups. In an example, this may be based on the location of the vehicles and vehicles in disjoint locations are clustered together. The goal or the grouping is to place UEs with independent information into the same logical cluster to minimize collisions. The subscriber transmits the interest packet to one cluster at a time during its ON duration. Depending on the response, the subscriber may move on to the next cluster, if necessary. In an example, the subscriber may choose which interest packets to transmit to which cluster based on the information that was used to partition the set of nodes (e.g., UEs).

In an example, instead of using duty cycles, the network interface at the wireless nodes may listen to a designated control channel for interest packets. Control channels tend to be very power efficient. If a match is discovered by a given node, then the node may be moved to a high-power mode where it would transmit the corresponding data packet. In an example, the nodes may use a low-power receiver such as a wake-up receiver to listen to the designated control channel.

Different techniques may be used to divide the publishers into different broadcast groups. For example, as illustrated, the problem may be modeled as a graph coloring problem where the underlying nodes in the graph are the different publishers. Two nodes have an edge between each other if their locations are close to each other (based on a threshold for e.g. a geometric graph). The goal is to color the nodes in this graph with the minimum number of colors such that no two nodes sharing an edge have the same color. All nodes having the same color form a logical group. Minimizing the number of colors reduces the number of groups and therefore minimizes the number of interest packets that need to be transmitted. In the example graph illustrated at FIG. 3, at most three interest packets are sent out—based on the node colorations where node 305 is one color, nodes 310A and 310B are a second color, and nodes 315A and 315B are a third color—and only one node will respond to any interest packet. This is a NP-hard problem and approximate greedy algorithms may be used.

Figure 4:
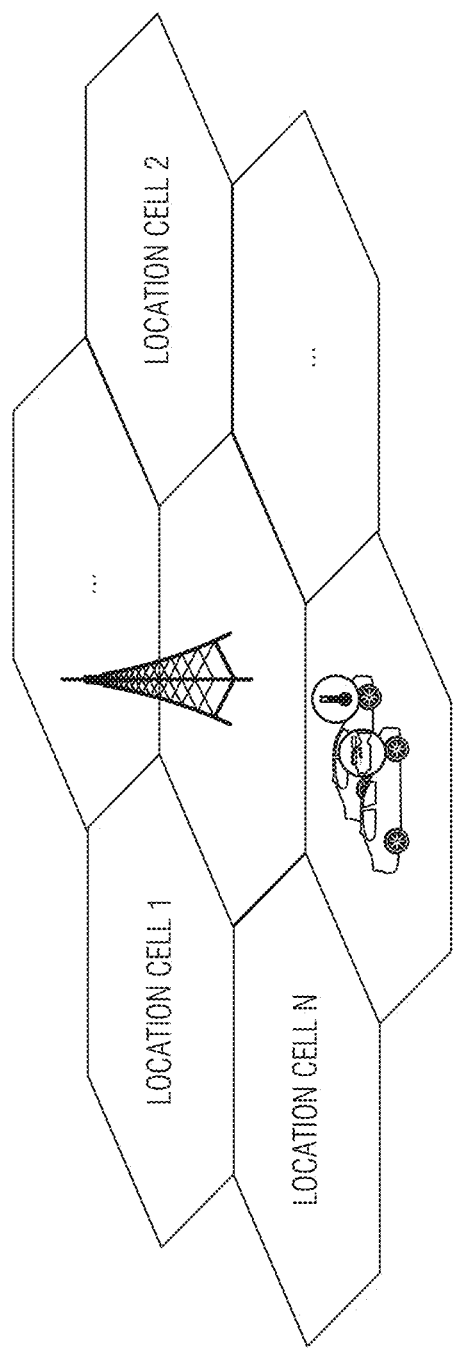
FIG. 4 illustrates an example of interest beamforming, according to an embodiment.

FIG. 4 illustrates an example of interest beamforming, according to an embodiment. Given an objective to collect and to create 360° video surveillance data at an edge node (e.g., at RSUs) using the video data obtained from the distributed nodes in the approximate region of the target location being surveilled, an ICN network, as Named-Data Networking, is considered. The ICN routing protocol runs on top of any MAC or PHY layer to fetch unique data packets and requests them by name instead of by node address. an efficient co-design of the wireless (PHY or MAC) layers as well as the information routing layer (NDN layer) is used where the wireless PHY/MAC is reconfigured in order to optimally serve the content (e.g., using NDN layer information) while also intelligently designing the NDN layer and namespace to cater to the wireless PHY/MAC capabilities. Such a co-design and orchestration across layers allows efficient communication leading to high network performance, potential energy savings, and optimal bandwidth usage.

For contrast, a baseline approach using ICN without co-design may include, at each RSU, sending a 360° video request within its coverage area. This may use the broadcast channels of current wireless networks. The autonomous vehicle (AV) that has the data matching the requested information establishes connection with the RSU before an overlay network may send the video of interest. The RSU collects such video information after establishing and terminating connections with each of the AVs, and then the RSU performs post-processing of the received correlated video information to obtain the 3D video of interest.

The AVs, however, may contain correlated data and do not all need to transmit their entire 3D video content and consume an enormous amount of bandwidth. To overcome this, several named interests with greater location precision may be issued which may not only increase the load in the network but also increase the likelihood of collisions between such interest and data transmissions.

To address these problems, the wireless layers of the AV and RSU are optimized for the information of interest. Similarly, the information routing layer, specifically, the named interest and data packet, is designed such that it maximizes the wireless layers' efficiency and improves information rate while minimizing bandwidth consumed.

For example, consider the naming convention. The naming convention used is communicated between the RSU (subscriber) and AVs (publishers). The naming convention exchange phase may also include the exchange between subscribers and publishers about the essential parameters needed for publishers to publish their video content. In an example, this may be achieved by using a generic interest packet in the network without optimized codesign. In an example, existing wireless technologies (e.g., Bluetooth, WLAN, Cellular, etc.) may be utilized to communicate the naming convention utilized for data communication.

There may be several naming possibilities. Some options may include:

A fuzzy naming convention. A fuzzy naming convention is utilized where the interest packets are named using the location range of interest (x1,y1,z1) to (x2,y2,z2). In this case, the AVs that may match with any locations in the range may respond with the data packet.

A no-location name convention. In this approach, the interest packets are beam-formed to only locations of interest. Therefore, the AVs that receive the packet match other fields and do not need to match any location coordinates in order to respond with data. This may be a key differentiator when it comes to reducing the overheads with sending numerous interest packets or computational overhead due to using a fuzzy naming convention.

In an example, the privacy and authentication related issues in the content naming may be addressed. If the name contains the spatial coordinates and particular information about the content available at the publisher, privacy may be important. Otherwise, any eavesdropper or receiver that may receive the transmission from a publisher may associate the interest or data to infer that a certain named content is available at an AV. A digital signature mechanism along with a one-way hash function may be used to protect the privacy of the publisher while also being able to validate the publisher's data.

The RSU may use Enhanced Privacy Identification (ID) (EPID) to create a signature of the actual named data which will be name utilized in the ICA layer. The AVs receive the signed names. In order to determine a match, the AVs use their own private keys (EPID) to obtain the signature. If there is a match between the two signatures, the AV may transmit the data back to the publisher (RSU).

In an example, application-aware and context-aware named data network (NDN) Forwarding strategies may be used. The subscriber may also monitor the network and the application status for activity before issuing the interest packets. This may be achieved by tracking network and application statistics such as average node density in the area, 360° video requirements, priority of fields-of-views of interest. For example, if there is a need for several fields-of-views in order to construct the 360° video, the RSU may flood its network with several interest packets with high periodicity. This may significantly increase the chances of receiving the needed field-of-views in time to perform the 360° video stitching.

In an example, intelligent NDN-aware wireless layer reconfiguration may be used. The wireless layers may be reconfigured such that the named data may be retrieved in a bandwidth efficient way. The NDN packets may be distributed in the network intelligently such that overall bandwidth may be conserved. To achieve this, broadcast of all NDN packets may be very inefficient. On the other hand, unicast of NDN to each AV attached to the RSU needs connection establishment, negotiation, termination which all entail signaling load. Instead, an intelligent multicast transmission may be used. This may be achieved in several ways:

Beamforming of interest packets: Antenna arrays at the transmitter may be utilized to beam-form packets where subscribers may send interest packets using beamforming. This may naturally limit the transmission of interest to the locations of interest. This method makes particular sense for the use case under consideration where the edge node is only interested in video segments from different FoVs in order to construct the 360° video surveillance. Hence, separating the area into zones/sectors where each sector naturally corresponds to FoVs may naturally mitigate duplicate transmission of interest or corresponding video data. The beamwidth of the antenna, direction may be determined based on the ICN information routing layer. This may be the location of interest provided by the application layer which allows the PHY to be reconfigured to allow beamforming of interest packet. In an example, the application layer information is: <Location range of interest>; and the physical layer information needed are beamforming parameters <azimuth, elevation>. FIG. 4 illustrates the RSU area partitioned into location cells and multiple interest packets may be beam-formed simultaneously onto location cells of interest.

One may also efficiently design the physical layer beams to optimize simultaneous transmission of the interest packets through spatial reuse. The beam pattern may be designed based on the information of which FoVs we are interested in since the beam direction is highly correlated with the FoV direction (e.g., assuming a dominant line-of-sight scenario). Further the beam patterns of multiple vehicles may be globally optimized to maximize spatial reuse since the locations of all vehicles are known to all other vehicles in the neighborhood (based on DSRC/V2V safety message exchanges).

One may form an optimization problem to determine the beam directions of all vehicles in a neighborhood that want to exchange/transmit this video information so that maximal parallel sessions are supported. For example, let $w_i$ be the beamformer weight at the ith vehicle that determines the beam direction. Also, let $l_i$ be the location of the ith vehicle and F be the set of all FoVs of interest. One may form a global optimization problem:

$$\max_{w_i} g(w_i, l_i, F)$$

where g( ) is a cost function for the spatial reuse while minimizing interference.

Fairness, quality and overcoming boundary node issues. In order to give opportunity for other publishers to respond to the interest packet, the following methods may be utilized.

Indications in the interest packet. The subscriber may indicate a special field in the interest packet that indicates "multiple responses needed." In an example, the interest packet may indicate a fairness criterion such as a minimum lapsed time before a publisher may send their data. Only the publishers that have satisfied this minimum lapsed time are allowed to respond to the interest. In an example, Tmin indicates the time since the last data packet transmission. In an example, Tmin may indicate the minimum time delay required for a node between receiving the interest packet and issuing a data packet as a response.

Indications in the Data packet. The publisher may use a "quality indicator" field in the data packet to rank the quality of their data packet in response to a certain interest. This may be obtained based on the camera precision, location accuracy, primary link quality, video resolution among other parameters. If the subscriber had issued a "multiple response needed" in the interest packet, the subscriber may wait to receive multiple data packets from several publishers and observe the "quality indicator" field to determine which data packets satisfy the quality criteria.

Figure 5:
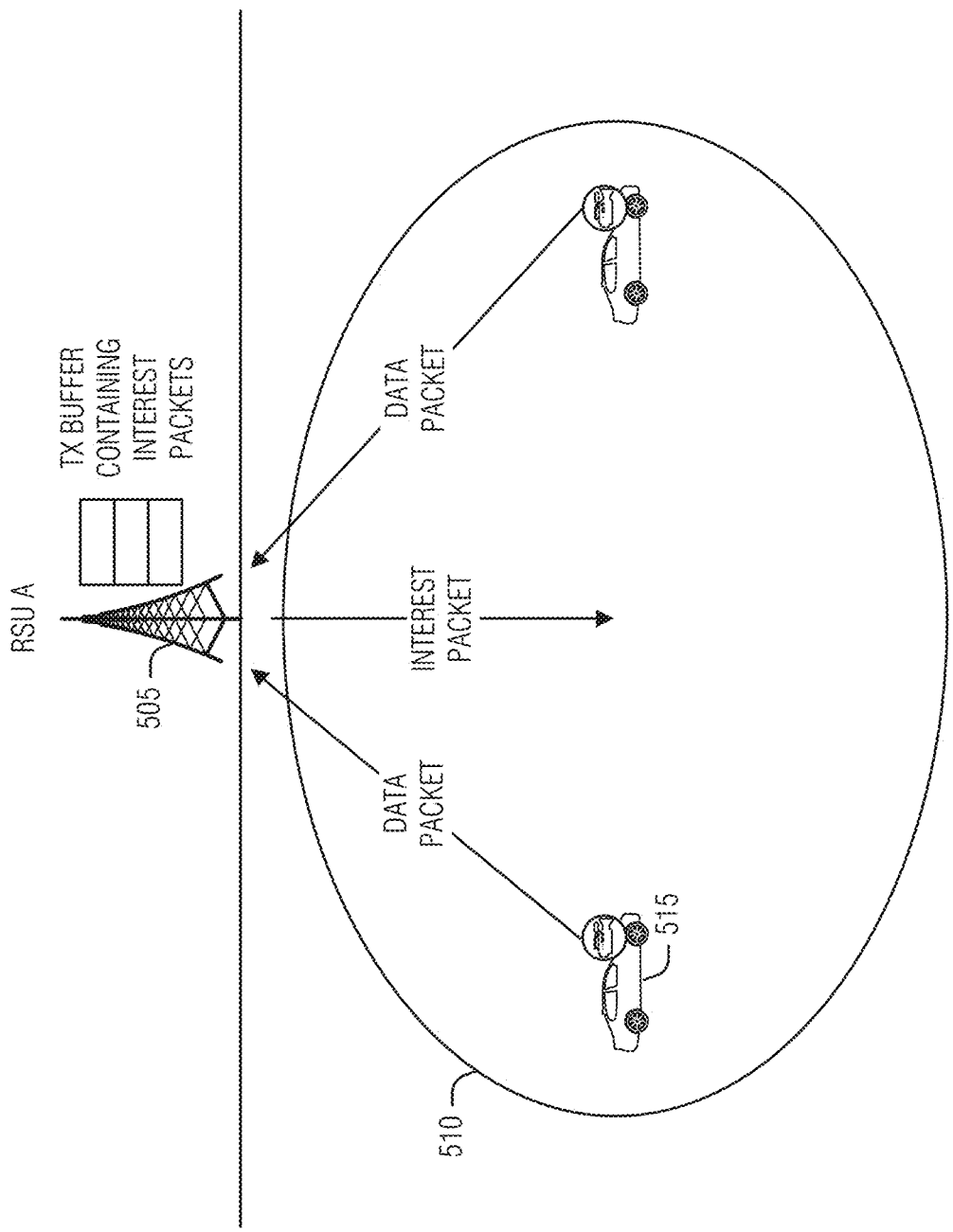
FIG. 5 illustrates an example of local congestion for interests, according to an embodiment.

FIG. 5 illustrates an example of local congestion for interests, according to an embodiment. Consider the example of forming 3D real-time video surveillance data at the edge nodes (e.g., RSUs 505) using video data obtained from the nodes (e.g., AVs) in the target location 510. An ICN network typically defines a network protocol that may run on top of any physical/medium-access layer and adopts a pull-based model to fetch uniquely named data packets from data producers or publishers; routing of requests for data (often called interests) coming from data consumers or subscribers, is based on the name of the data, rather than on an end-host address.

As illustrated in FIG. 5, interest packets are issued by RSU A 505 requesting video information for different Fields-of-views. Publishers (AVs) who match the named interest respond with their data packets. Efficient co-design of the wireless MAC layer considering the information routing layer (ICN) and PHY layers is developed where the wireless PHY/MAC is reconfigured in order to optimally serve the content (using information routing layer provided data) while also intelligently designing the information routing layer and namespace to cater to the wireless PHY/MAC capabilities. Such a co-design and orchestration across layers allows efficient communication leading to high network performance, potential energy savings and optimal bandwidth usage.

Node A 505 (RSU) sends multiple interest packets corresponding to locations 510 corresponding to FoVs of interest. Assuming that the RSU 505 and the forwarding nodes (e.g., the autonomous vehicles AVs) have the capability to send interest packets targeted to specific fields of view and has the capability to beamform given the specific fields of view. In such a scenario, a space division multiplexing (SDM) technique may be employed. In an example, when the RSU 505 and AVs do not support beamforming, other MAC mechanisms may be utilized to forward the interest packets.

In an example, demand-based interest-packet generation may be used. The edge node may generate one or more interest packets corresponding to the data of interest. If the edge node requires a large number of video segments to construct the surveillance data, several interest packets may be generated corresponding to each field of view. In an example, a single named interest packet that requests one or more fields-of-views may also be generated so that the likelihood of reaching publishers using a single interest packet transmission may be higher.

Priority-order of interest packets in transmitter buffer may be used. It is possible that the several interest packets generated at the edge node have different priorities. As such, interest packets are ordered based on their priority according to one of the following rules: a. longest elapsed-time based; or b. FoV priority based. Such information may be provided by the information routing layer in the interest packet itself. For example, a new priority-ordering field may provision such indication for the MAC layer to reorder the interest packets based on the priority rules.

MAC designs for interest packet transmission may be used. For example, a contention-based mechanism. If a contention-based mechanism is utilized, the edge node may use an access control parameter than may determine a backoff counter to be used before transmitting an interest packet or a set of interest packets. The value of the access control parameter may be determined as a function f(buf_size, network_load, urgency of first interest . . . ) where buf_size is the size of the transmitter buffer indicating the number of outstanding interest packets and network_load is the current load in the network.

Another MAC design is a frequency and time division-based approach. In this case, one key question is how the RSU 505 polls the publishers for data. There are two aspects to it. One is how to associate the publisher with the data of interest, e.g., data from a specific location 510 is needed, how to get the data from a publisher taken from a specific location 510. Another aspect is how to schedule the data transmission from a publisher.

For the first aspect, the RSU 505 may include in the interest packet multiple locations from where it needs the data. The publishers or nodes who have the data from the requested locations may respond.

For the second aspect—e.g., for the publisher to know when and what air interface resource to use to send the data—the RSU 505 may specify the time slot or frequency slot (resource unit) associated with the location. In legacy networks, the RSU/BS/AP 505 may specify the user-ID or MAC-ID to associate the user transmission with the time or frequency slot, or an ICN name may be used.

Another MAC design is data packet transmission. Data packets in response to interest packets may be either beamformed or transmitted omni-directionally. Both methods are discussed here. For example, beamformed data packets. When data packets are beamformed back to the transmitter, it is possible that the other nodes in the vicinity cannot hear the data packets. This may result in several duplicate transmission of data packets in the network leading to overload of the network with redundancies. Intelligent methods to notify other nodes in the network of the data fulfilment may be used.

Further, broadcast and multicast phase during data transmission is considered. The publisher of data may involve a broadcast phase as well as a multicast phase when transmitting the data packet. For example, only the header information of the data packet may be included in an initial broadcast phase which allows other nodes to hear the data transmission and hence avoid repeating the data. Followed by this, the node may switch to a multicast phase where it may beamform the data packet toward the originator of the interest packet.

Intentional transmission on a major lobe with several minor lobes in other directions is considered. The publisher may do adaptive antenna transmission with the data packet beamformed in a major lobe and also on several minor lobes that may allow nearby nodes to determine that the data has been transmitted. A "data fulfilled" field may be utilized to indicate to the other nodes that the data has been transmitted in response to the interest packet.

An omnidirectional header with directional data is considered. A combination of the above two schemes may be used wherein the publisher simultaneous modulates the header information on an omnidirectional beam and the entire data on the directional beam (using possibly spreading and low-rate coding) and transmits the beam. In such a case, the other nodes may overhear the header information which is low-rate and therefore may be decoded even if it's a lower power transmission due to being omni-directional and the directional beam is received by the subscriber.

For some of these approaches, it is still possible that an attacker may still be a valid producer but distribute garbage data to prevent meaningful data collection (e.g., to create blind spots). Thus, a parameter to tune the redundancy is proposed. To be precise, other publishers randomly decide whether to respond or not in case they hear a data packet in broadcast transmission or to observe a "data fulfilled." The parameter p is the probability associated with a response. If it is set to 0, it is assumed that there will be no malicious producer. If p is set to something else, then a degree of redundancy controlled by p is used.

Consider omni-directional data packet transmission. The issue of transmitting the data packets omni-directionally is the collisions and interference with other data packets. To avoid this, a couple of approaches may be used. For example, a contention-based approach. For each producer that is waiting to transmit back to the Edge node, the following operations are followed:

1. If channel is busy, producer node listens and reads other transmissions.
2. Decode the data packet header transmitted to check if it fulfills the same interest packet as the same node. This may be done in different ways as below:
    2a. Check for content name of the data packet header and match it to the content name of the data packet that the node is waiting to transmit. If contents match, abort transmission.

2b. To more quickly verify whether the data packet currently being transmitted over the air is the same the other producer nodes are waiting to transmit, one may apply an Interest Sequence # instead of the content name to match with waiting data packet sequence #, inside the node's buffer.

2c. Producer nodes send data packets only within a certain time window. If the channel is busy the entire time during this window, producer node may assume another node has fulfilled the interest packet unless it sees the interest packet again.

In an example, a contention-free approach may be used. In this approach, producers send or set a 1-bit flag with the content name to indicate they have data for a given interest packet and its size to ask to schedule resources on the uplink to the edge node, which centrally schedules all requests. If the edge node receives two scheduling requests with the same content, then the edge node assigns resources to only one of the producers. The edge node may pick the producer based on their proximity, signal strength characteristics for more efficient data delivery to the consumer node. In an example, selection of the producer by an edge node may be driven by higher-layer information from the interest packet, such as a data quality indicator. This higher-layer information may be exchanged between the edge node and the producers ahead of time, such as during an essential-parameter exchange phase.

Figure 6:
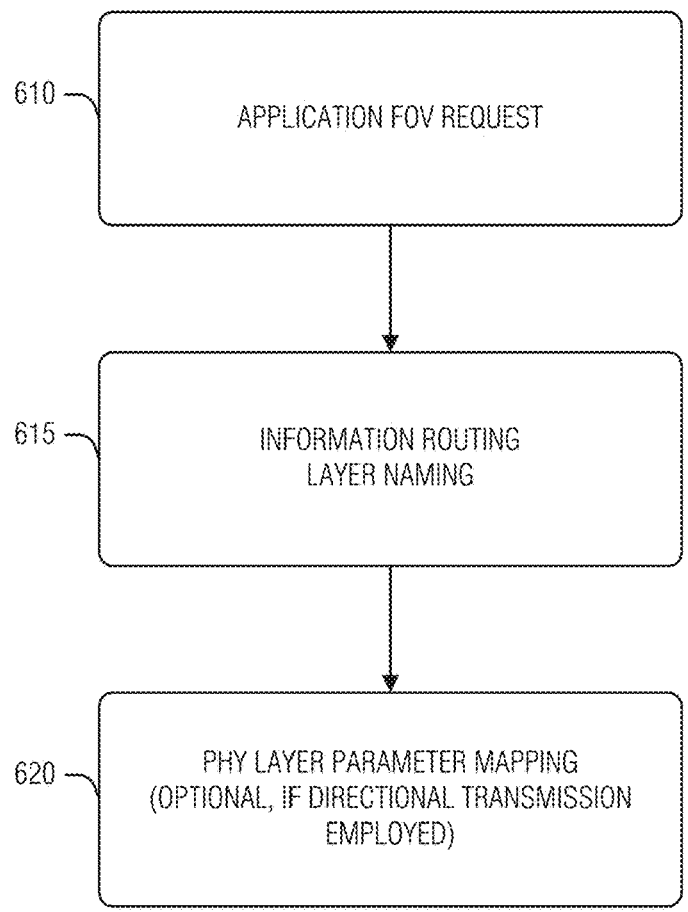
FIG. 6 illustrates an example of a technique to determine field of views that are of interest, according to an embodiment.

FIG. 6 illustrates an example of a technique 600 to determine field of views that are of interest, according to an embodiment. A higher layer (e.g., application layer) information may be used to design the ICN content name (operation 610). For example, assuming that the application layer request has content names that map to the namespace convention used within the information routing layer. The ICN name in turn is designed such that that the angle of viewing from a given reference location, e.g., x, y, z, $\theta$, $\phi$, reference direction, may be interpreted by the wireless physical layer to understand the direction of beam along which the interest packet is sent (operation 615). Additional fields may be inserted into the interest packets that may provide a reference location information (operation 620). Each forwarding node may use this information coupled with the name information to determine the FoV of interest and hence the beamforming parameters (if supported).

Figure 7:
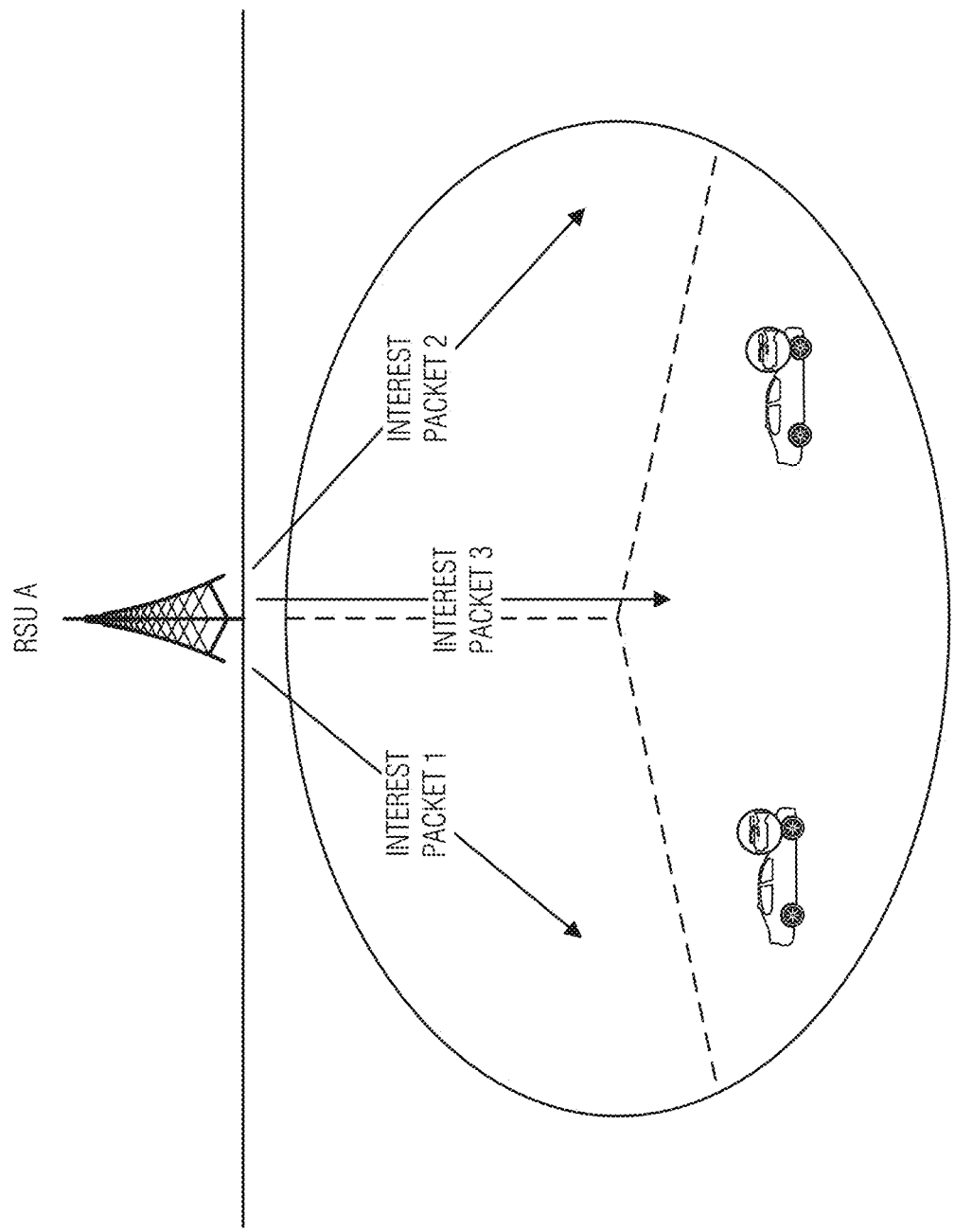
FIG. 7 illustrates an example of space-division multiple access for ICN, according to an embodiment.

FIG. 7 illustrates an example of space-division multiple access for ICN, according to an embodiment. If the RSU and forwarding nodes support SDMA, single user beamforming or multi-user beamforming methods may be utilized to direct interest packet to certain locations. When multi-beaming is employed, where the same or different interest packets are transmitted into different spatial regions (beam width determined from the methods in (1)), it is also important to determine the number of interest packets to be transmitted simultaneously. To achieve this, based on the antenna capability, the number of simultaneous beams may be determined in one method as the min($N_{tx}$, $N_{int}$) where $N_{tx}$ is the number of transmit antennas and $N_{int}$ is the number of interest packets in the transmit buffer. Other methods, such as the available channel information in the target location, may be utilized to determine the number of simultaneous beams.

Figure 8:
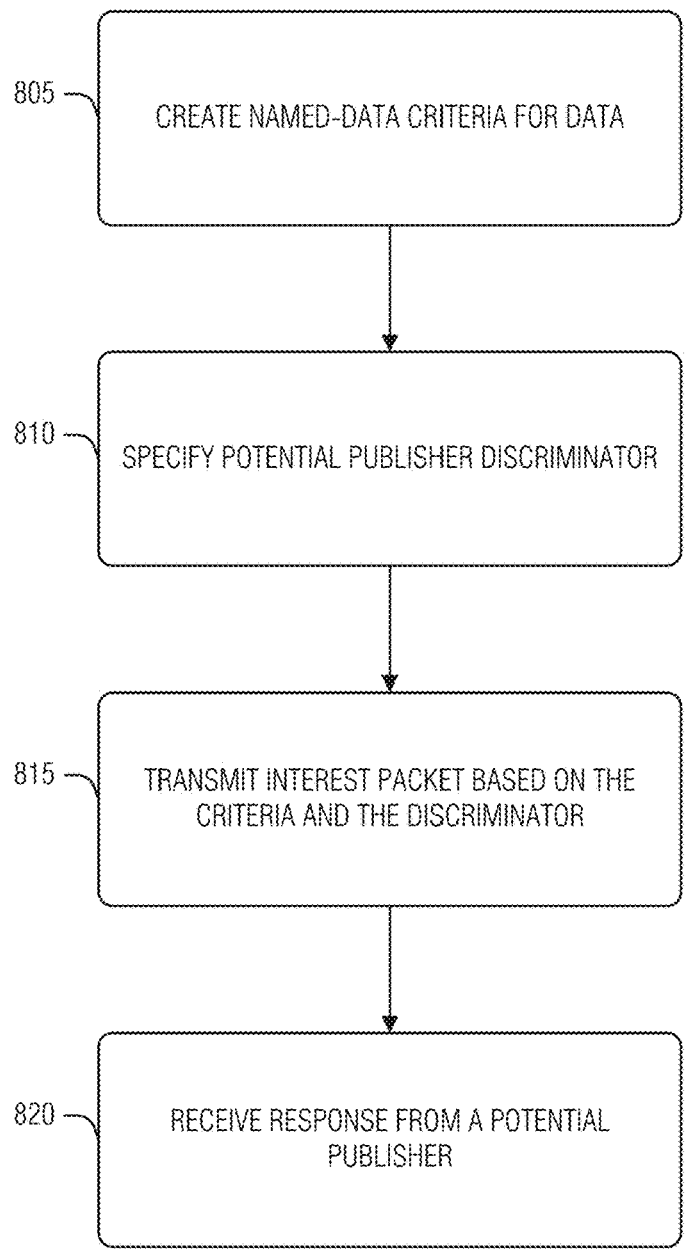
FIG. 8 illustrates a flow chart of an example of a method for publisher control in an ICN, according to an embodiment.

FIG. 8 illustrates a flow chart of an example of a method 800 for publisher control in an ICN, according to an embodiment. The operations of the method 800 are implemented in computer hardware, such as that described above or below (e.g., processing circuitry).

At operation 805, named data criteria is constructed that identifies data for a workload. Here, the workload may be displaying video content, producing a data set from a data base, etc. In an example, the workload is constructing a scene, such as from an automobile crash, a music concert, etc. In an example, the data is sensor data of a geographic location. This is generally useful for scene construction, or other applications, such as security monitoring, accident monitoring on roadways, etc.

In an example, the named data criteria include a bound on the data. This is a type of fuzzy matching based on the name. Here, the data bound indicates a tolerance from a precise value that is acceptable. For example, if the desired data is a particular image field-of-view (FoV), such as a concert stage, at a specific time, such as 16:20, the bound may match data within five minutes of 16:20.

In an example, the named data criteria include a state of the data. This state of data may define a transformation or scope of the data that deviates from raw sensor data. An example may include an aggregation, whereby different publishers pool or combine their data—such as averaging the data, providing the output of a classifier operating on the raw data, compressing the raw data, etc. Enabling publishers to respond with data in a different state from which it is harvested from sensors may provide several benefits by distributing processing, or reducing network load by repeatedly sending the same data.

In an example, the named data criteria include a priority (e.g., that is transmitted in an interest packet). In an example, the priority is based on elapsed time or FoV. The priority thus specifies which data is more valuable while enabling a variety of tolerances. For example, the name may specify that data between 16:00 and 16:30 is interesting while the priority indicates that data closer to 16:15 is more valuable (e.g., the priority value drops the further away from 16:15 the data gets). A similar scenario is used in the case of FoV (e.g., the closer to a desired FoV the higher the priority of data within the named data criteria tolerances).

At operation 810, a discriminator for potential publishers of the data is specified. The discriminator is used to reduce the number of potential publishers. In a wireless physical layer to the ICN, the reduction in potential publishers may be possible through a variety of techniques, such as directed radio transmission (e.g., beamforming), selecting appropriate radio access points, etc. Not only does this have the potential of using the radio network more efficiently, but it may also reduce the amount of processing performed by the publishers generally.

In an example, the discriminator is a cluster head of the potential publishers. Clustering the publishers is an option to more efficiently use publisher resources. Generally, a device is elected as a cluster head for the cluster. Here, the discriminator directs the interest packet below to the cluster head. The cluster head will then coordinate a response among members of the cluster.

In an example, the discriminator is a function that, when evaluated by a potential publisher, provides an indication as to whether or not the potential publisher will respond with the data. In an example, the function is a probability based on a total number of potential publishers. For example, if there are ten potential publishers, the function may define a probability of two-in ten. Each potential publisher may compute a random number and modulo it by ten. If the result is nine or ten r other pair of numbers specified in the function), then the publisher responds, otherwise it does not. If there are enough potential publishers, then the probability that one will compute a "respond" result is sufficient to reduce the probability to one divided by the number of potential publishers.

In an example, where the data is sensor data of a geographic location, the discriminator may be a FoV of sensors of the potential publishers. Here, the foreknowledge of the potential publisher sensor FoVs is leveraged to include only those potential publishers with possibly relevant sensor data, which entails eliminating those potential publishers with likely irrelevant sensor data. In an example, the corresponding named data criteria may specify the FoV within a tolerance that may be used to construct an interest packet with a name that specifies the tolerance.

At operation 815, an interest packet based on the named data criteria and the discriminator is transmitted. In an example, transmitting the interest packet includes cycling through the potential publishers using at least one of contention, frequency, time, or space. By dividing up the potential publishers and cycling through them, it is possible to get the desired data before every potential publisher is contacted. The division of the potential publishers may be further designed to increase the probability of getting a response to the data request earlier in the search.

In an example, the space (e.g., spatial division) is a geographic location. In an example, transmitting the interest packet based on the discriminator includes beamforming a transmission to potential publishers in the geographic location. In an example, the geographic location is subdivided into segments. Here, the beamforming cycles through the segments. This physical subdivision reduces potential publishers that may all have the relevant data by virtue of being in the geographic location. For example, if vehicles on two roads have a view to an accident at an intersection, vehicles on one road may be subject to a beamformed interest packet before vehicles on the second road.

In an example, potential publishers are divided into logical segments. In an example, each logical segment includes potential publishers in different segments of the geographic location. Here, the beamforming cycles through the segments. The logical division provides greater control over the number of potential publishers that may respond at any given time. Further, the logical division may be constructed to contact only those publishers for a given broadcast that have different information. Thus, if two vehicles have roughly the same position vis-à-vis a target location, then these vehicles will be in different logical groups as it is probable that either one will provide the relevant information.

In an example, where the discriminator is a cluster head of the potential publishers, transmitting the interest packet based on the discriminator includes transmitting the interest packet to the cluster head. As noted above, the cluster head then coordinates a single response from the potential publishers.

In an example, where the named data criteria include a state of the data, the interest packet includes a function to aggregate the data. This function is applied by responding potential publishers to aggregate the results of other potential publishers. Here, instead of avoiding contact to some potential publishers, an efficient result is achieved by combining the responses of potential publishers at various levels of a network hierarchy. Further, this aggregation response strategy may be combined with selecting appropriate publishers to achieve significant efficiencies in the wireless network.

At operation 820, a response to the interest packet is received from one of the potential publishers. In an example, where the interest packet included an indication for multiple responses, the result from the one potential publisher is one of multiple results. Requesting multiple responses provides for some redundancy in potential publisher answers. Further, such a technique may defeat malicious potential publishers that routinely respond quickly with poor or no data to suppress legitimate responses from other potential publishers. In an example, the result includes a quality indicator. This quality indicator may be used to select which of multiple responses to use to complete the workload.

In an example, the one potential publisher responded to the interest packet after observing a second potential publisher responding to the interest packet based on a second function. The second function is used by the potential publishers to independently to evaluate, in a multiple response scenario, whether to also respond. The function may include a probability (much like the first function above), or the like. In an example, the second function is based on the potential publisher having higher quality or priority data than that included in the observed response.

In an example, receiving the response includes transmitting an interest fulfilled packet to prevent other potential publishers from transmitting additional responses to the interest packet.

In an example, when the named data criteria include a bound, the result from the potential publisher is less than the data and within the bound of the data. Thus, the potential publisher self-sensors based on the bound in the interest packet. In an example, the potential publisher transmitted the result in response to a second potential publisher transmitting a second result that is also less than and within the bound of the data, the first result and the second result being different. Here, the presumption is that the bound specifies all relevant data. That the response is within the bound but does not cover the bound prompts another potential publisher to respond when it provides additional (e.g., different) data within the bound.

In an example, the potential publisher transmitted the result using at least one of a broadcast, lobed beam, or hybrid, the hybrid including an omnidirectional header and a beamformed payload. Here, the directed transmission of the result reduces interference for other potential publishers. However, broadcasting the result may be used by other potential publishers to avoid re-sending the same data. The hybrid technique enables other potential publishers to identify what is being sent in the response without congesting the wireless medium with the data itself. This may provide the greatest flexibility in potential publisher mediated response throttling and wireless medium efficiency.

Figure 9:
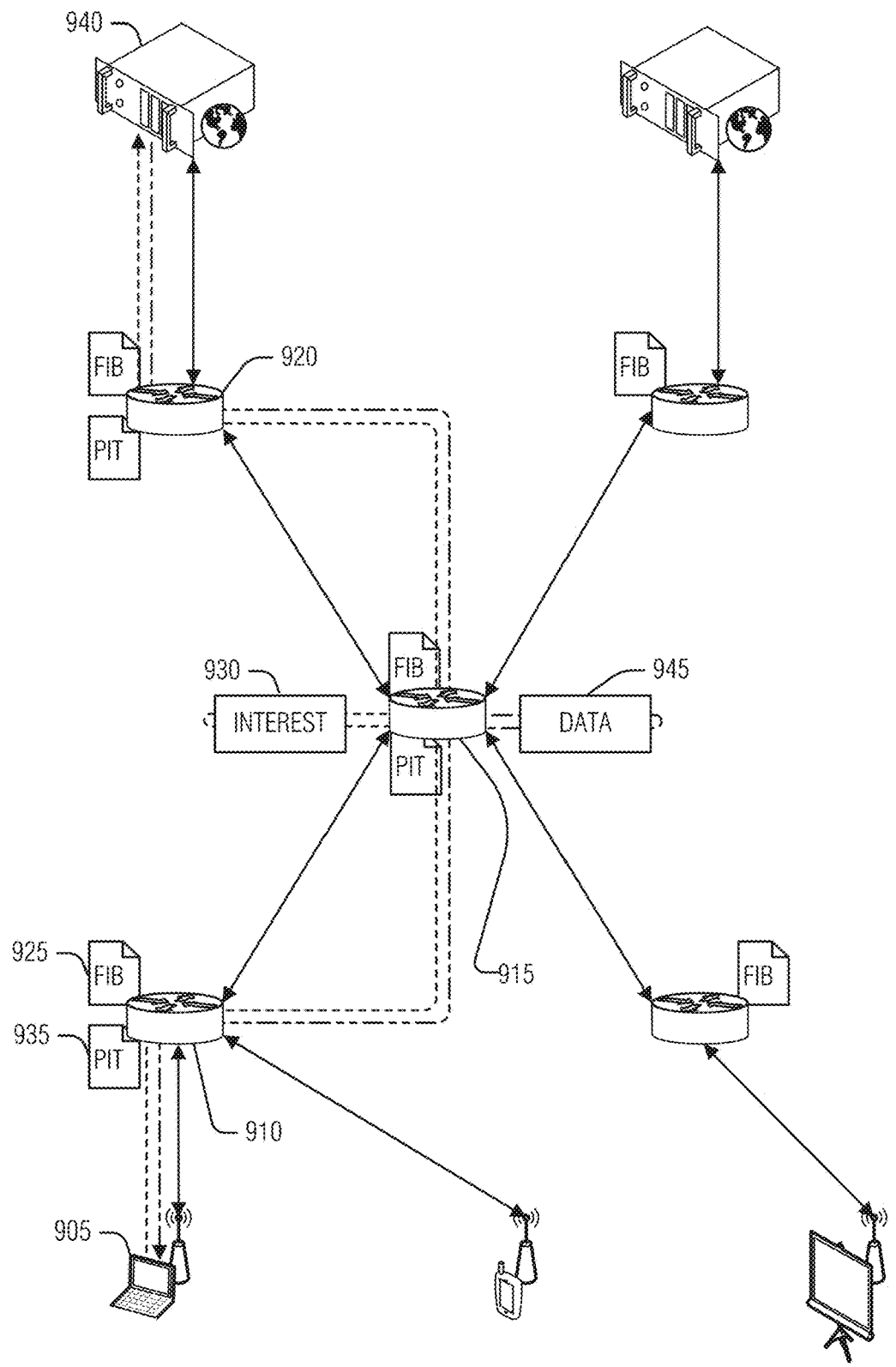
FIG. 9 illustrates an example ICN, according to an embodiment.

FIG. 9 illustrates an example ICN, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 905 (e.g., subscriber) requests named content from the network itself. The content request may be called an interest and transmitted via an interest packet 930. As the interest packet 930 traverses network devices (e.g., network elements, routers, switches, hubs, etc.)—such as network elements 910, 915, and 920—a record of the interest is kept, for example, in a pending interest table (PIT) at each network element. Thus, network element 910 maintains an entry in its PIT 935 for the interest packet 930, network element 915 maintains the entry in its PIT, and network element 920 maintains the entry in its PIT.

When a device, such as publisher 940, that has content matching the name in the interest packet 930 is encountered, that device 940 may send a data packet 945 in response to the interest packet 930. Typically, the data packet 945 is tracked back through the network to the source (e.g., device 905) by following the traces of the interest packet 930 left in the network element PITs. Thus, the PIT 935 at each network element establishes a trail back to the subscriber 905 for the data packet 945 to follow.

Matching the named data in an ICN may follow several strategies. Generally, the data is named hierarchically, such as with a universal resource identifier (URI). For example, a video may be named www.somedomain.com/videos/v8675309. Here, the hierarchy may be seen as the publisher, "www.somedomain.com," a sub-category, "videos," and the canonical identification "v8675309." As an interest 9630 traverses the ICN, ICN network elements will generally attempt to match the name to a greatest degree. Thus, if an ICN element has a cached item or route for both "www.somedomain.com/videos" and "www.somedomain.com/videos/v8675309," the ICN element will match the later for an interest packet 930 specifying "www.somedomain.com/videos/v8675309," In an example, an expression may be used in matching by the ICN device. For example, the interest packet may specify "www.somedomain.com/videos/v8675*" where '*' is a wildcard. Thus, any cached item or route that includes the data other than the wildcard will be matched.

Item matching involves matching the interest 930 to data cached in the ICN element. Thus, for example, if the data 945 named in the interest 930 is cached in network element 915, then the network element 915 will return the data 945 to the subscriber 905 via the network element 910. However, if the data 945 is not cached at network element 915, the network element 915 routes the interest 930 on (e.g., to network element 920). To facilitate routing, the network elements may use a forwarding information base 925 (FIB) to match named data to an interface (e.g., physical port) for the route. Thus, the FIB 925 operates much like a routing table on a traditional network device.

In an example, additional meta-data may be attached to the interest packet 930, the cached data, or the route (e.g., in the FIB 925), to provide an additional level of matching. For example, the data name may be specified as "www.somedomain.com/videos/v8675309," but also include a version number—or timestamp, time range, endorsement, etc. In this example, the interest packet 930 may specify the desired name, the version number, or the version range. The matching may then locate routes or cached data matching the name and perform the additional comparison of meta-data or the like to arrive at an ultimate decision as to whether data or a route matches the interest packet 930 for respectively responding to the interest packet 930 with the data packet 945 or forwarding the interest packet 930.

ICN has advantages over host-based networking because the data segments are individually named. This enables aggressive caching throughout the network as a network element may provide a data packet 930 in response to an interest 930 as easily as an original author 940. Accordingly, it is less likely that the same segment of the network will transmit duplicates of the same data requested by different devices.

Fine grained encryption is another feature of many ICN networks. A typical data packet 945 includes a name for the data that matches the name in the interest packet 930. Further, the data packet 945 includes the requested data and may include additional information to filter similarly named data (e.g., by creation time, expiration time, version, etc.). To address malicious entities providing false information under the same name, the data packet 945 may also encrypt its contents with a publisher key or provide a cryptographic hash of the data and the name. Thus, knowing the key (e.g., from a certificate of an expected publisher 940) enables the recipient to ascertain whether the data is from that publisher 940. This technique also facilitates the aggressive caching of the data packets 945 throughout the network because each data packet 945 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Figure 10:
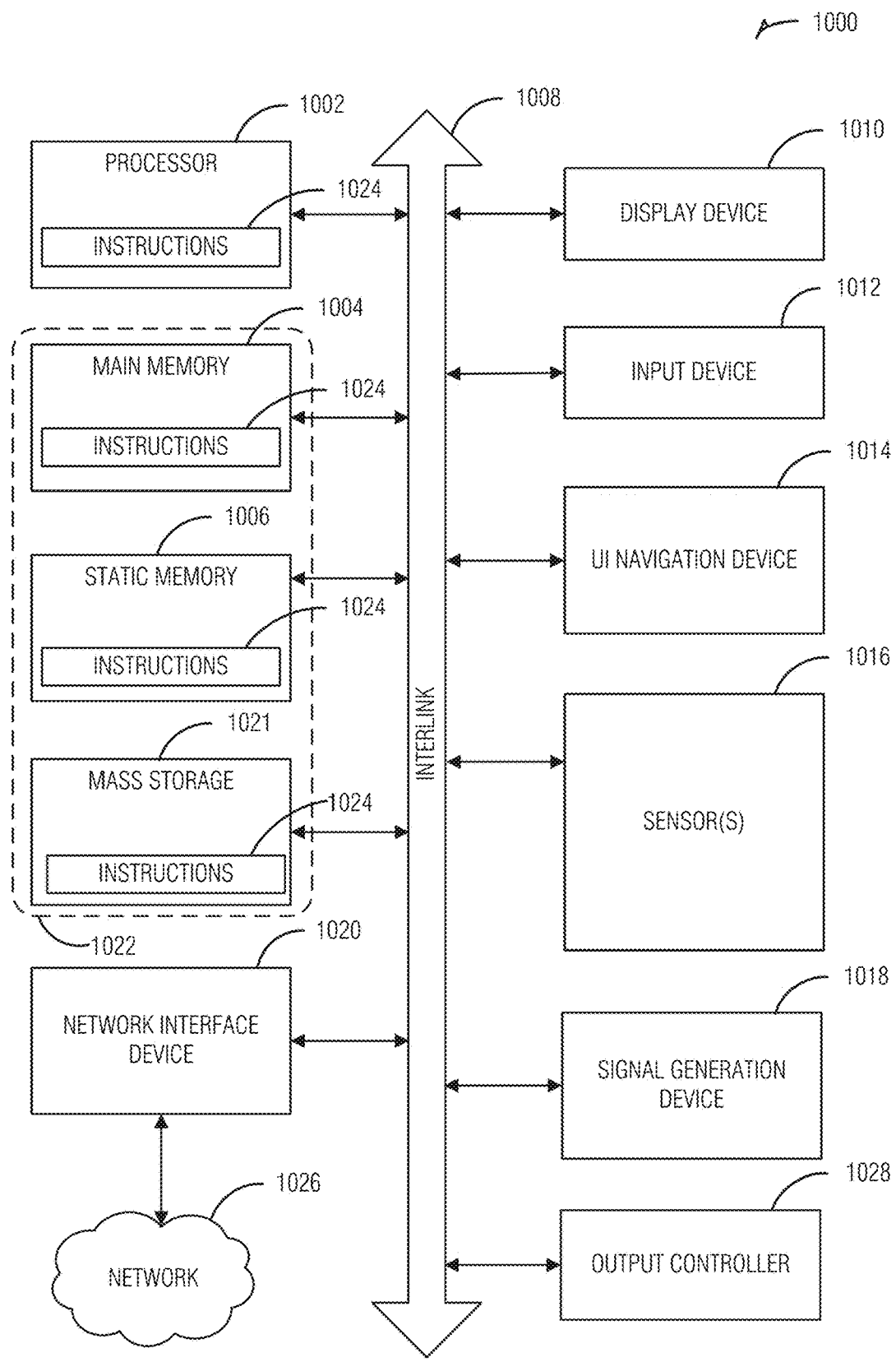
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. Examples, as described herein, may include, or may operate by, logic or a number of components, or mechanisms in the machine 1000. Circuitry (e.g., processing circuitry) is a collection of circuits implemented in tangible entities of the machine 1000 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1000 follow.

In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine computer system) 1000 may include a hardware processor 1002 (e.g., a central processing unit (CPU), a graphics processing unit (GPU), a hardware processor core, or any combination thereof), a main memory 1004, a static memory (e.g., memory or storage for firmware, microcode, a basic-input-output (BIOS), unified extensible firmware interface (UM), etc.) 1006, and mass storage 1008 (e.g., hard drive, tape drive, flash storage, or other block devices) some or all of which may communicate with each other via an interlink (e.g., bus) 1030. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1008, a signal generation device 1018 (e.g., a speaker), a network interface device 1020, and one or more sensors 1016, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.).

Registers of the processor 1002, the main memory 1004, the static memory 1006, or the mass storage 1008 may be, or include, a machine readable medium 1022 on which is stored one or more sets of data structures or instructions 1024 (e.g., software) embodying or utilized by any one or more of the techniques or functions described herein. The instructions 1024 may also reside, completely or at least partially, within any of registers of the processor 1002, the main memory 1004, the static memory 1006, or the mass storage 1008 during execution thereof by the machine 1000. In an example, one or any combination of the hardware processor 1002, the main memory 1004, the static memory 1006, or the mass storage 1008 may constitute the machine readable media 1022. While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1022 may be representative of the instructions 1024, such as instructions 1024 themselves or a format from which the instructions 1024 may be derived. This format from which the instructions 1024 may be derived may include source code, encoded instructions (e.g., in compressed or encrypted form), packaged instructions (e.g., split into multiple packages), or the like. The information representative of the instructions 1024 in the machine readable medium 1022 may be processed by processing circuitry into the instructions to implement any of the operations discussed herein. For example, deriving the instructions 1024 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1024.

In an example, the derivation of the instructions 1024 may include assembly, compilation, or interpretation of the information (e.g., by the processing circuitry) to create the instructions 1024 from some intermediate or preprocessed format provided by the machine readable medium 1022. The information, when provided in multiple parts, may be combined, unpacked, and modified to create the instructions 1024. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1024 may be further transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium.

ADDITIONAL NOTES & EXAMPLES

Example 1 is a device for publisher control in an information centric network (ICN), the device comprising: a memory including instructions; and processing circuitry that, when in operation, is configured by the instructions to: construct named data criteria to identify data for a workload; specify a discriminator for potential publishers of the data; transmit an interest packet based on the named data criteria and the discriminator; and receive a response to the interest packet from one of the potential publishers.

In Example 2, the subject matter of Example 1, wherein the discriminator is a function that, when evaluated by a potential publisher, provides an indication as to whether or not the potential publisher will respond with the data.

In Example 3, the subject matter of Example 2, wherein the function is a probability based on a total number of potential publishers.

In Example 4, the subject matter of any of Examples 1-3, wherein the one potential publisher responded to the interest packet after observing a second potential publisher responding to the interest packet based on a second function.

In Example 5, the subject matter of any of Examples 1-4, wherein, to receive the response, the instructions configured the processing circuitry to transmit an interest fulfilled packet to prevent other potential publishers from transmitting additional responses to the interest packet.

In Example 6, the subject matter of any of Examples 1-5, wherein, to transmit the interest packet, the instructions configured the processing circuitry to cycle through the potential publishers using at least one of contention, frequency, time, or space.

In Example 7, the subject matter of Example 6, wherein the space is a geographic location.

In Example 8, the subject matter of Example 7, wherein, to transmit the interest packet based on the discriminator, the instructions configured the processing circuitry to beamform a transmission to potential publishers in the geographic location.

In Example 9, the subject matter of Example 8, wherein the geographic location is subdivided into segments, and wherein the beamforming cycles through the segments.

In Example 10, the subject matter of any of Examples 8-9, wherein potential publishers are divided into logical segments, each logical segment including potential publishers in different segments of the geographic location, and wherein the beamforming cycles through the segments.

In Example 11, the subject matter of any of Examples 1-10, wherein the potential publisher transmitted the result using at least one of a broadcast, lobed beam, or hybrid, the hybrid including an omnidirectional header and a beam-formed payload.

In Example 12, the subject matter of any of Examples 1-11, wherein the discriminator is a cluster head of the potential publishers, and wherein, to transmit the interest packet based on the discriminator, the instructions configured the processing circuitry to transmit the interest packet to the cluster head, the cluster head coordinating a single response from the potential publishers resulting in the one potential publishers providing the result.

In Example 13, the subject matter of any of Examples 1-12, wherein the named data criteria include a bound on the data.

In Example 14, the subject matter of Example 13, wherein the result from the potential publisher is less than the data and within the bound of the data.

In Example 15, the subject matter of Example 14, wherein the potential publisher transmitted the result in response to a second potential publisher transmitting a second result that is also less than and within the bound of the data, the first result and the second result being different.

In Example 16, the subject matter of any of Examples 13-15, wherein the named data criteria include a state of the data, and wherein the result an aggregation of other results from other potential publishers received at the one potential publisher.

In Example 17, the subject matter of Example 16, wherein the interest packet includes a function to aggregate the data, and wherein the one of the potential publishers applied the function to achieve the result.

In Example 18, the subject matter of any of Examples 1-17, wherein the data is sensor data of a geographic location, and wherein the discriminator is a field-of-view (FoV) of sensors of the potential publishers.

In Example 19, the subject matter of Example 18, wherein the named data criteria specify the FoV within a tolerance, and wherein the interest packet includes a name that specifies the tolerance.

In Example 20, the subject matter of Example 19, wherein the named data criteria include a priority that is transmitted in the interest packet.

In Example 21, the subject matter of Example 20, wherein the priority is based on elapsed time or FoV.

In Example 22, the subject matter of any of Examples 1-21, wherein the interest packet includes an indication for multiple responses, the result from the one potential publisher being one of multiple results.

In Example 23, the subject matter of any of Examples 1-22, wherein the result includes a quality indicator.

Example 24 is a method for publisher control in an information centric network (ICN), the method comprising: constructing named data criteria to identify data for a workload; specifying a discriminator for potential publishers of the data; transmitting an interest packet based on the named data criteria and the discriminator; and receiving a response to the interest packet from one of the potential publishers.

In Example 25, the subject matter of Example 24, wherein the discriminator is a function that, when evaluated by a potential publisher, provides an indication as to whether or not the potential publisher will respond with the data.

In Example 26, the subject matter of Example 25, wherein the function is a probability based on a total number of potential publishers.

In Example 27, the subject matter of any of Examples 24-26, wherein the one potential publisher responded to the interest packet after observing a second potential publisher responding to the interest packet based on a second function.

In Example 28, the subject matter of any of Examples 24-27, wherein receiving the response includes transmitting an interest fulfilled packet to prevent other potential publishers from transmitting additional responses to the interest packet.

In Example 29, the subject matter of any of Examples 24-28, wherein transmitting the interest packet includes cycling through the potential publishers using at least one of contention, frequency, time, or space.

In Example 30, the subject matter of Example 29, wherein the space is a geographic location.

In Example 31, the subject matter of Example 30, wherein transmitting the interest packet based on the discriminator includes beamforming a transmission to potential publishers in the geographic location.

In Example 32, the subject matter of Example 31, wherein the geographic location is subdivided into segments, and wherein the beamforming cycles through the segments.

In Example 33, the subject matter of any of Examples 31-32, wherein potential publishers are divided into logical segments, each logical segment including potential publishers in different segments of the geographic location, and wherein the beamforming cycles through the segments.

In Example 34, the subject matter of any of Examples 24-33, wherein the potential publisher transmitted the result using at least one of a broadcast, lobed beam, or hybrid, the hybrid including an omnidirectional header and a beamformed payload.

In Example 35, the subject matter of any of Examples 24-34, wherein the discriminator is a cluster head of the potential publishers, and wherein transmitting the interest packet based on the discriminator includes transmitting the interest packet to the cluster head, the cluster head coordinating a single response from the potential publishers resulting in the one potential publishers providing the result.

In Example 36, the subject matter of any of Examples 24-35, wherein the named data criteria include a bound on the data.

In Example 37, the subject matter of Example 36, wherein the result from the potential publisher is less than the data and within the bound of the data.

In Example 38, the subject matter of Example 37, wherein the potential publisher transmitted the result in response to a second potential publisher transmitting a second result that is also less than and within the bound of the data, the first result and the second result being different.

In Example 39, the subject matter of any of Examples 36-38, wherein the named data criteria include a state of the data, and wherein the result is an aggregation of other results from other potential publishers received at the one potential publisher.

In Example 40, the subject matter of Example 39, wherein the interest packet includes a function to aggregate the data, and wherein the one of the potential publishers applied the function to achieve the result.

In Example 41, the subject matter of any of Examples 24-40, wherein the data is sensor data of a geographic location, and wherein the discriminator is a field-of-view (FoV) of sensors of the potential publishers.

In Example 42, the subject matter of Example 41, wherein the named data criteria specify the FoV within a tolerance, and wherein the interest packet includes a name that specifies the tolerance.

In Example 43, the subject matter of Example 42, wherein the named data criteria include a priority that is transmitted in the interest packet.

In Example 44, the subject matter of Example 43, wherein the priority is based on elapsed time or FoV.

In Example 45, the subject matter of any of Examples 24-44, wherein the interest packet includes an indication for multiple responses, the result from the one potential publisher being one of multiple results.

In Example 46, the subject matter of any of Examples 24-45, wherein the result includes a quality indicator.

Example 47 is at least one machine readable medium including information representative of instructions for publisher control in an information centric network (ICN), the instructions, when executed by processing circuitry, cause the processing circuitry to perform operations comprising: constructing named data criteria to identify data for a workload; specifying a discriminator for potential publishers of the data; transmitting an interest packet based on the named data criteria and the discriminator; and receiving a response to the interest packet from one of the potential publishers.

In Example 48, the subject matter of Example 47, wherein the discriminator is a function that, when evaluated by a potential publisher, provides an indication as to whether or not the potential publisher will respond with the data.

In Example 49, the subject matter of Example 48, wherein the function is a probability based on a total number of potential publishers.

In Example 50, the subject matter of any of Examples 47-49, wherein the one potential publisher responded to the interest packet after observing a second potential publisher responding to the interest packet based on a second function.

In Example 51, the subject matter of any of Examples 47-50, wherein receiving the response includes transmitting an interest fulfilled packet to prevent other potential publishers from transmitting additional responses to the interest packet.

In Example 52, the subject matter of any of Examples 47-51, wherein transmitting the interest packet includes cycling through the potential publishers using at least one of contention, frequency, time, or space.

In Example 53, the subject matter of Example 52, wherein the space is a geographic location.

In Example 54, the subject matter of Example 53, wherein transmitting the interest packet based on the discriminator includes beamforming a transmission to potential publishers in the geographic location.

In Example 55, the subject matter of Example 54, wherein the geographic location is subdivided into segments, and wherein the beamforming cycles through the segments.

In Example 56, the subject matter of any of Examples 54-55, wherein potential publishers are divided into logical segments, each logical segment including potential publishers in different segments of the geographic location, and wherein the beamforming cycles through the segments.

In Example 57, the subject matter of any of Examples 47-56, wherein the potential publisher transmitted the result using at least one of a broadcast, lobed beam, or hybrid, the hybrid including an omnidirectional header and a beamformed payload.

In Example 58, the subject matter of any of Examples 47-57, wherein the discriminator is a cluster head of the potential publishers, and wherein transmitting the interest packet based on the discriminator includes transmitting the interest packet to the cluster head, the cluster head coordinating a single response from the potential publishers resulting in the one potential publishers providing the result.

In Example 59, the subject matter of any of Examples 47-58, wherein the named data criteria include a bound on the data.

In Example 60, the subject matter of Example 59, wherein the result from the potential publisher is less than the data and within the bound of the data.

In Example 61, the subject matter of Example 60, wherein the potential publisher transmitted the result in response to a second potential publisher transmitting a second result that is also less than and within the bound of the data, the first result and the second result being different.

In Example 62, the subject matter of any of Examples 59-61, wherein the named data criteria include a state of the data, and wherein the result an aggregation of other results from other potential publishers received at the one potential publisher.

In Example 63, the subject matter of Example 62, wherein the interest packet includes a function to aggregate the data, and wherein the one of the potential publishers applied the function to achieve the result.

In Example 64, the subject matter of any of Examples 47-63, wherein the data is sensor data of a geographic location, and wherein the discriminator is a field-of-view (FoV) of sensors of the potential publishers.

In Example 65, the subject matter of Example 64, wherein the named data criteria specify the FoV within a tolerance, and wherein the interest packet includes a name that specifies the tolerance.

In Example 66, the subject matter of Example 65, wherein the named data criteria include a priority that is transmitted in the interest packet.

In Example 67, the subject matter of Example 66, wherein the priority is based on elapsed time or FoV.

In Example 68, the subject matter of any of Examples 47-67, wherein the interest packet includes an indication for multiple responses, the result from the one potential publisher being one of multiple results.

In Example 69, the subject matter of any of Examples 47-68, wherein the result includes a quality indicator.

Example 70 is a system for publisher control in an information centric network (ICN), the system comprising: means for constructing named data criteria to identify data for a workload; means for specifying a discriminator for potential publishers of the data; means for transmitting an interest packet based on the named data criteria and the discriminator; and means for receiving a response to the interest packet from one of the potential publishers.

In Example 71, the subject matter of Example 70, wherein the discriminator is a function that, when evaluated by a potential publisher, provides an indication as to whether or not the potential publisher will respond with the data.

In Example 72, the subject matter of Example 71, wherein the function is a probability based on a total number of potential publishers.

In Example 73, the subject matter of any of Examples 70-72, wherein the one potential publisher responded to the interest packet after observing a second potential publisher responding to the interest packet based on a second function.

In Example 74, the subject matter of any of Examples 70-73, wherein the means for receiving the response include means for transmitting an interest fulfilled packet to prevent other potential publishers from transmitting additional responses to the interest packet.

In Example 75, the subject matter of any of Examples 70-74, wherein the means for transmitting the interest packet include means for cycling through the potential publishers using at least one of contention, frequency, time, or space.

In Example 76, the subject matter of Example 75, wherein the space is a geographic location.

In Example 77, the subject matter of Example 76, wherein the means for transmitting the interest packet based on the discriminator include means for beamforming a transmission to potential publishers in the geographic location.

In Example 78, the subject matter of Example 77, wherein the geographic location is subdivided into segments, and wherein the beamforming cycles through the segments.

In Example 79, the subject matter of any of Examples 77-78, wherein potential publishers are divided into logical segments, each logical segment including potential publishers in different segments of the geographic location, and wherein the beamforming cycles through the segments.

In Example 80, the subject matter of any of Examples 70-79, wherein the potential publisher transmitted the result using at least one of a broadcast, lobed beam, or hybrid, the hybrid including an omnidirectional header and a beamformed payload.

In Example 81, the subject matter of any of Examples 70-80, wherein the discriminator is a cluster head of the potential publishers, and wherein the means for transmitting the interest packet based on the discriminator include means for transmitting the interest packet to the cluster head, the cluster head coordinating a single response from the potential publishers resulting in the one potential publishers providing the result.

In Example 82, the subject matter of any of Examples 70-81, wherein the named data criteria include a bound on the data.

In Example 83, the subject matter of Example 82, wherein the result from the potential publisher is less than the data and within the bound of the data.

In Example 84, the subject matter of Example 83, wherein the potential publisher transmitted the result in response to a second potential publisher transmitting a second result that is also less than and within the bound of the data, the first result and the second result being different.

In Example 85, the subject matter of any of Examples 82-84, wherein the named data criteria include a state of the data, and wherein the result is an aggregation of other results from other potential publishers received at the one potential publisher.

In Example 86, the subject matter of Example 85, wherein the interest packet includes a function to aggregate the data, and wherein the one of the potential publishers applied the function to achieve the result.

In Example 87, the subject matter of any of Examples 70-86, wherein the data is sensor data of a geographic location, and wherein the discriminator is a field-of-view (FoV) of sensors of the potential publishers.

In Example 88, the subject matter of Example 87, wherein the named data criteria specify the FoV within a tolerance, and wherein the interest packet includes a name that specifies the tolerance.

In Example 89, the subject matter of Example 88, wherein the named data criteria include a priority that is transmitted in the interest packet.

In Example 90, the subject matter of Example 89, wherein the priority is based on elapsed time or FoV.

In Example 91, the subject matter of any of Examples 70-90, wherein the interest packet includes an indication for multiple responses, the result from the one potential publisher being one of multiple results.

In Example 92, the subject matter of any of Examples 70-91, wherein the result includes a quality indicator.

Example 93 is at least one machine-readable medium including instructions that, when executed by processing circuitry, cause the processing circuitry to perform operations to implement of any of Examples 1-92.

Example 94 is an apparatus comprising means to implement of any of Examples 1-92.

Example 95 is a system to implement of any of Examples 1-92.

Example 96 is a method to implement of any of Examples 1-92.

Example 97 is at least one machine-readable storage medium comprising information representative of instructions that, when executed by processing circuitry, cause the processing circuitry to perform the operations of any of Examples 1-92.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for publisher control in an information centric network (ICN), the device comprising:
    a memory including instructions; and
    processing circuitry that, when in operation, is configured by the instructions to:
        construct named data criteria, for an interest packet, to identify data for a workload;
        specify a discriminator for potential publishers of the data, wherein potential publishers are nodes that would respond to the interest packet based solely on the named data criteria, and wherein the discriminator is a function that, when evaluated by potential publishers, provides an indication as to whether or not a given potential publisher will respond with the data;
        transmit the interest packet based on the named data criteria and the discriminator;
        receive, based on the discriminator, a response to the interest packet from one of the potential publishers and not another potential publisher, the one of the potential publishers executing the discriminator to determine that the response should be sent and the another potential publisher executing the discriminator to determine that no response should be sent; and
        transmit, based on receipt of the response, an interest fulfilled packet to prevent other potential publishers from transmitting additional responses to the interest packet.

2. The device of claim 1, wherein, to transmit the interest packet, the instructions configured the processing circuitry to cycle through the potential publishers using at least one of contention, frequency, time, or space.

3. The device of claim 1, wherein the named data criteria include a bound on the data.

4. The device of claim 3, wherein the named data criteria include a state of the data, and wherein the result is an aggregation of other results from other potential publishers received at the one potential publisher.

5. The device of claim 4, wherein the interest packet includes a function to aggregate the data, and wherein the one of the potential publishers applied the function to achieve the result.

6. The device of claim 1, wherein the data is sensor data of a geographic location, and wherein the discriminator is a field-of-view (RN) of sensors of the potential publishers.

7. The device of claim 1, wherein the interest packet includes an indication for multiple responses, the result from the one potential publisher being one of multiple results.

8. The device of claim 1, wherein the function is a probability based on a total number of potential publishers.

9. A method for publisher control in an information centric network (ICN), the method comprising:
    constructing named data criteria, for an interest packet, to identify data for a workload;

specifying a discriminator for potential publishers of the data, wherein potential publishers are nodes that would respond to the interest packet based solely on the named data criteria, and wherein the discriminator is a function that, when evaluated by potential publishers, provides an indication as to whether or not a given potential publisher will respond with the data;

transmitting the interest packet based on the named data criteria and the discriminator;

receiving, based on the discriminator, a response to the interest packet from one of the potential publishers and not another potential publisher, the one of the potential publishers executing the discriminator to determine that the response should be sent and the another potential publisher executing the discriminator to determine that no response should be sent; and transmitting, based on receipt of the response, an interest fulfilled packet to prevent other potential publishers from transmitting additional responses to the interest packet.

10. The method of claim 9, wherein transmitting the interest packet includes cycling through the potential publishers using at least one of contention, frequency, time, or space.

11. The method wherein the named data criteria include a bound on the data.

12. The method of claim 11, wherein the named data criteria include a state of the data, and wherein the result is an aggregation of other results from other potential publishers received at the one potential publisher.

13. The method of claim 12, wherein the interest packet includes a function to aggregate the data, and wherein the one of the potential publishers applied the function to achieve the result.

14. The method of claim 9, wherein the data is sensor data of a geographic location, and wherein the discriminator is a field-of-view (FoV) of sensors of the potential publishers.

15. The method of claim 9, wherein the interest packet includes an indication for multiple responses, the result from the one potential publisher being one of multiple results.

16. The method of claim 9, wherein the function is a probability based on a total number of potential publishers.

17. At least one non-transitory machine readable medium including information representative of instructions for publisher control in an information centric network (ICN), the instructions, when executed by processing circuitry, cause the processing circuitry to perform operations comprising:

constructing named data criteria, for an interest packet, to identify data for a workload;

specifying a discriminator for potential publishers of the data, wherein potential publishers are nodes that would respond to the interest packet based solely on the named data criteria, and wherein the discriminator is a function that, when evaluated by potential publishers, provides an indication as to whether or not a given potential publisher will respond with the data;

transmitting the interest packet based on the named data criteria and the discriminator;

receiving, based on the discriminator, a response to the interest packet from one of the potential publishers and not another potential publisher, the one of the potential publishers executing the discriminator to determine that the response should be sent and the another potential publisher executing the discriminator to determine that no response should be sent; and transmitting, based on receipt of the response, an interest fulfilled packet to prevent other potential publishers from transmitting additional responses to the interest packet.

18. The at least one machine readable medium of claim 17, wherein transmitting the interest packet includes cycling through the potential publishers using at least one of contention, frequency, time, or space.

19. The at least one machine readable medium of claim 17, wherein the named data criteria include a bound on the data.

20. The at least one machine readable medium of claim 19, wherein the named data criteria include a state of the data, and wherein the result, is an aggregation of other results from other potential publishers received at the one potential publisher.

21. The at least one machine readable medium of claim 20, wherein the interest packet includes a function to aggregate the data, and wherein the one of the potential publishers applied the function to achieve the result.

22. The at least one machine readable medium of claim 17, wherein the data is sensor data of a geographic location, and wherein the discriminator is a field-of-view (FoV) of sensors of the potential publishers.

23. The at least one machine readable medium of claim 17, wherein the interest packet includes an indication for multiple responses, the result from the one potential publisher being one of multiple results.

24. The at least one machine readable medium of claim 17, wherein the function is a probability based on a total number of potential publishers.

* * * * *

UNITED STATES PATENT AND TRADEMARK OFFICE
CERTIFICATE OF CORRECTION

PATENT NO. : 11,218,907 B2  
APPLICATION NO. : 16/236037  
DATED : January 4, 2022  
INVENTOR(S) : Balakrishnan et al.

Page 1 of 1

It is certified that error appears in the above-identified patent and that said Letters Patent is hereby corrected as shown below:

In the Claims

In Column 28, Line 58, in Claim 6, delete "(RN)" and insert --(FoV)-- therefor

In Column 29, Line 25, in Claim 11, after "method", insert --of claim 9,--

In Column 30, Line 31, in Claim 20, delete "result," and insert --result-- therefor Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*